MAGNETIC WAND ACTUATED TOY

Filed June 22, 1950 3 Sheets-Sheet 1

INVENTORS
JACK C. WILSON
HARRY W. WILSON
BY Samuel J. Stoll
ATTORNEY

INVENTORS
JACK C. WILSON
HARRY W. WILSON
BY Samuel J. Stoe
ATTORNEY

Fig. 9.
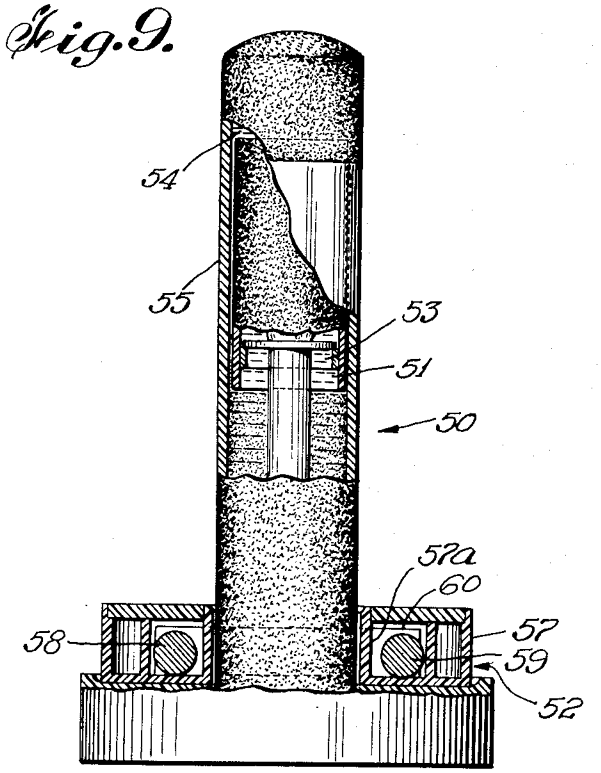
Fig. 10. Fig. 11.
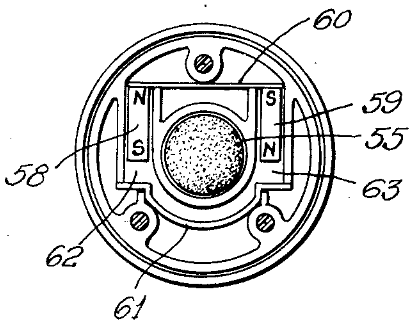
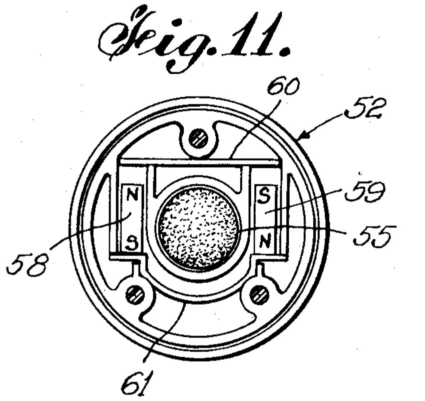
INVENTORS
JACK C. WILSON
HARRY W. WILSON
BY Samuel J. Stoll
ATTORNEY Patented Aug. 11, 1953

2,648,157

UNITED STATES PATENT OFFICE 2,648,157

MAGNETIC WAND ACTUATED TOY

Jack C. Wilson, Garden City, and Harry W. Wilson, Hempstead, N. Y.

Application June 22, 1950, Serial No. 169,716

5 Claims. (Cl. 46—45)

This invention relates to a magnetic toy.

The magnetic toy which is herein described and claimed provides an optical illusion. It is actuated by means of magnetic forces which are manually controlled. The toy may assume many varied forms of which three preferred forms are shown in the drawing and described in the specification. In one of these preferred forms, the principal feature of the toy is the optical illusion which it provides. In the other two preferred forms, two important features are provided: the optical illustion and a trick magnetic means for effecting said optical illusion.

The principal object of this invention is the provision of a magnetic toy in which the figure of a human being or natural object or the like is immersed in a clear fluid confined within a container which is at least partly transparent, and wherein the optical illusion of an opaque fluid rising to engulf the figure and then subsiding to clear the figure, is created by magnetic means. More specifically, a movable sleeve is mounted within said container for movement toward and away from the figure. The figure is centrally disposed relative to the sleeve and when the sleeve is caused to move in one direction, it receives the figure and conceals the same from view. When the sleeve is caused to move in the opposite direction, it uncovers the figure which then returns to view. The sleeve is opaque and its movement through the clear fluid in the container in either direction therein, creates the illusion of a moving body of opaque fluid. This illusion is rendered most realistic by the fact that the container is, itself, opaque, in part, its opacity corresponding to the opacity of the sleeve. The sleeve moves into and out of the opaque portion of the container with no visible evidence of a parting line between said sleeve and said opaque portion of the container.

The movement of the sleeve is magnetically controlled, at least in one direction. In the preferred forms of this invention, the sleeve is bouyant in the liquid and it normally tends to rise to cover and conceal the figure. The sleeve is provided with a magnetic member or with a member which is responsive to magnetic forces. A magnetic wand is then provided which may be waved or otherwise moved past the magnetic or magnetically responsive member on the sleeve. The sleeve is thereby caused to move in the direction of movement of the wand. To expose the figure, this movement would be downward to overcome the buoyancy of the sleeve. In the preferred forms of this invention the wand assumes the shape of a ring and the container assumes the form of a cylinder. The dimensions of the ring and cylinder are respectively such as to enable the ring to accommodate the cylinder in slidable relation thereto.

In one preferred form of the invention, the ring is made of non-magnetic material and fixedly mounted therein and concealed from view, is at least one magnet, and preferably a pair of magnets, arranged to attract the magnetic or magnetically responsive member in the sleeve. In the other two preferred forms of the invention, the magnet or magnets are movably mounted in said ring. In one position, they attract the magnetically responsive member in the sleeve; in another position their magnetic influence upon said magnetically responsive member in the sleeve is negligible. Hence in one position, the magnets in the ring may be employed to change the position of the sleeve; in another position, said magnets cannot be employed for that purpose. The change in position of the magnets in the ring may be effected by tapping or otherwise jarring the ring. When said ring is tapped at one point, the magnets will be caused to slide in the direction of that point. When the ring is tapped at a diametrically opposite point, the magnets are caused to slide in a diametrically opposite direction. Ferrous plates are fixed in the ring at opposite ends of the lines of travel of said magnets and these plates serve as anchors for said magnets, temporarily or detachably securing said magnets at the respective ends of their lines of travel.

The preferred forms of the invention which have above been mentioned are illustrated in the accompanying drawing in which:

Fig. 9 is a view similar to that of Fig. 6 showing a magnetic toy made in accordance with the third preferred form of this invention.

Fig. 10 is a top view similar to that of Fig. 7 showing the construction of the magnetic ring which is used in said third form of the invention.

Fig. 11 is another top view, similar to that of Fig. 8, showing the magnets in inoperative position.

Figure 1:
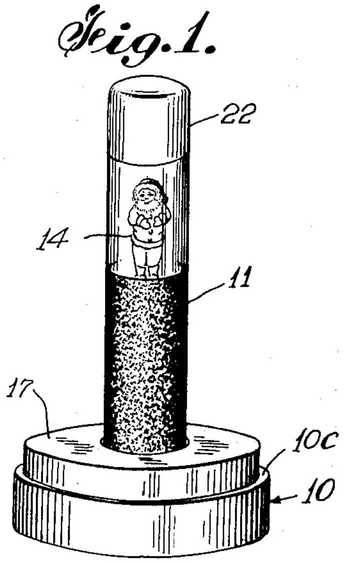
Fig. 1 is a front perspective view of a magnetic toy incorporating the features of one of said preferred forms of the invention, showing the human figure exposed to view in response to the action of the magnetic ring.

The form of invention illustrated in the first five figures of the drawing is the simpler of the two forms. It comprises the following component parts: a base 10, a cylindrical container 11 of fluid 12, a fixed pedestal 13 in said container supporting a human figure 14 or the like, a buoyant sleeve 15 movably mounted within said container, a magnetically responsive ring 16 secured to said sleeve, and a control ring 17 which is either itself magnetic or, as Fig. 3 clearly shows, is made of non-magnetic material and carries a pair of bar magnets 18 and 19 respectively.

Base 10 is, preferably, molded of plastic material. It is cylindrical in shape, its diametrical dimension exceeding its height. It has a top wall 10*a* with a circular hole 10*b* formed centrally thereof and a ridge 10*c* formed peripherally thereof along its top edge. The base has a cylindrical outer wall 10*d* extending downwardly from the peripheral edge of top wall 10*a*, and a cylindrical inner wall 10*e* formed concentrically therewith. The diameter of hole 10*b* in the top wall of the base is exceeded by the inside diameter of inner wall 10*e*. An annular flange 10*f* is thereby formed as an integral part of the top wall, said flange projecting radially inwardly from inner cylindrical wall 10*e*.

Cylindrical container 11 projects downwardly into hole 10*b* in the top wall of the base. It is provided with external screw threads at its lower end to receive internally threaded cap 20. As Fig. 3 clearly shows, the upper peripheral edge of said cap abuts against flange 10*f* of the base which serves as a shoulder relative thereto. The cylindrical container 11 is thereby locked against upward dislodgement with respect to the base. A plastic composition or sealing wax 21 or the like is applied to the bottom of the cap and to the inside surface of cylindrical wall 10*e* of the base, thereby securing cap 20 to said base and preventing downward dislodgement of said cap and hence of said cylindrical container, relative to the base.

Cylindrical container 11 is open at its lower end and it is provided with a closed upper end 11*a*. If desired, the thickness of the wall of said container may be reduced at its upper end to receive a top cap 22. By reason of this reduction in thickness, top cap 22 and cylindrical container 11 will present a flush, continuous outer surface. Cylindrical container 11 should be made of transparent material, such as clear plastics, at least part of the distance below top cap 22. In the preferred forms of this invention the entire container is made of transparent material. Cap 22 on the other hand is opaque and the lower portion of the container is rendered opaque by means of an opaque coating 23 on the inside of said container. This is clearly shown in Figs. 1 and 3. The fluid 12 which is confined within container 11 is a clear fluid and it may, if desired, comprise a glycerin-in-water solution. The viscosity and specific gravity of the fluid should be such as to render sleeve 15 buoyant within it.

Pedestal 13 which supports the human figure 14 is provided with a base 13*a* which has a radially outwardly extending annular flange 13*b*. It is clearly shown in Fig. 3 that flange 13*b* abuts the lower end of the cylindrical container 11. It is pressed tightly against said lower end of the container by screw cap 20, and a liquid-tight seal is thereby provided which prevents the fluid from leaking out of the bottom of the container. The main body of the base 13*a* fits snugly into the open lower end of said container to assist in sealing said container against leaks. This construction also serves the purpose of securely centering the pedestal in the cylindrical container.

A hole is formed at the top end of the pedestal, centrally and longitudinally thereof. The human figure 14, which in this instance represents or simulates Santa Claus, is provided with a downwardly projecting peg or pin 14*a* which may be press fitted into the hole at the top of the pedestal. If desired, an adhesive or cement or any other suitable means may be employed to affix the human figure to the pedestal or, if this should prove advisable, the human figure and the pedestal may be molded together to form a unitary, integral molding. A ring 14*b* may be interposed between the human figure and the pedestal to serve as a stop member for the movable sleeve 15 above mentioned.

Figures 3, 4, 5:
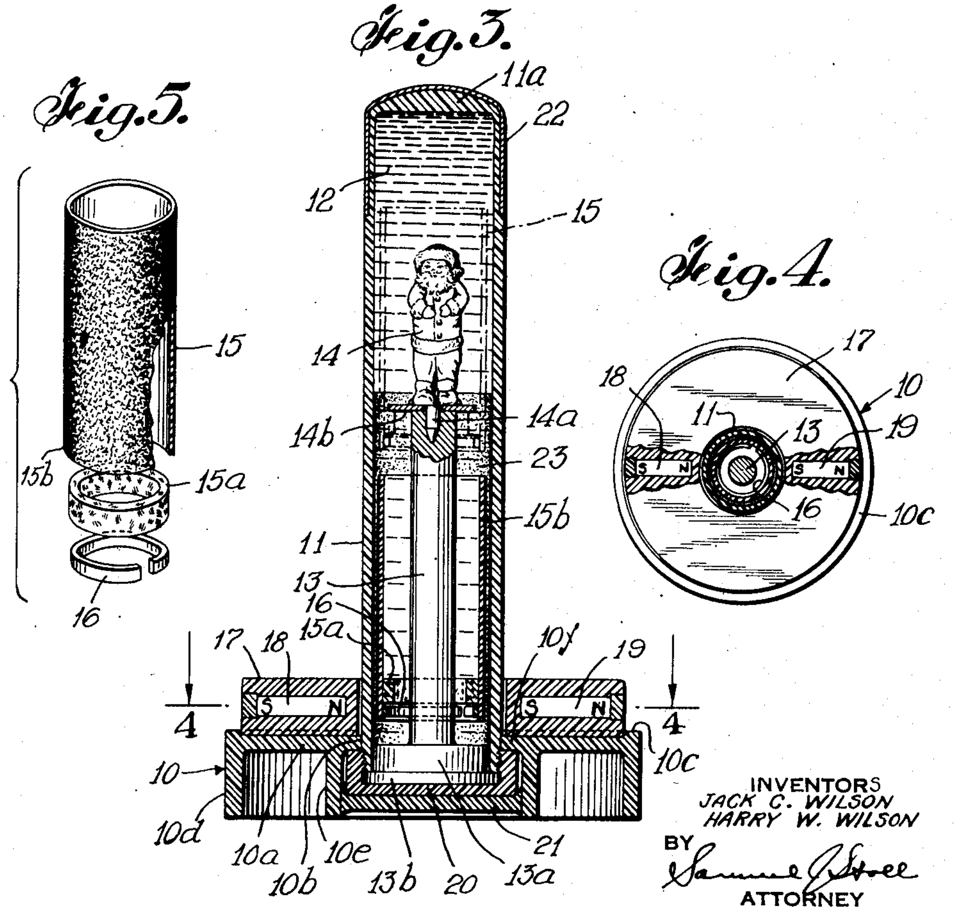
Fig. 3 is a longitudinal section through said magnetic toy, showing all of its operative parts.
Fig. 4 is a view looking downwardly in the direction of arrows 4, 4 of Fig. 3, the top wall of the magnetic ring being partly broken away to expose the two bar magnets which are fixedly mounted therein.
Fig. 5 is an exploded view in perspective of the sleeve, its buoyant element and its metallic ring which is responsive to the magnetic forces of the two bar magnets, said sleeve being partly broken away and in section to show that it may be made of plastic material rendered opaque by an outer opaque coating.

Sleeve 15 should be buoyant in fluid 12. The material of which the sleeve is made may be sufficiently buoyant for this purpose or a hollow construction should be employed which would render the sleeve buoyant. Another method of handling this problem is illustrated in Fig. 5 where it is shown that a buoyant ring 15*a*, such as a ring made of cork, may be incorporated into the sleeve to add its buoyancy to the normal buoyancy of the sleeve proper. The cork ring is inserted into the sleeve and a snug fit is provided between the ring and the sleeve to prevent dislodgement of said ring relative to said sleeve. It is this cork ring which engages ring 14*b* on pedestal 13 to limit the upward movement of the sleeve.

Magnetically responsive ring 16 is also secured to the inside of sleeve 15. This magnetically responsive ring is, in its preferred form, a split ring made of ferrous material. When it is inserted into the bottom of sleeve 15, immediately below cork ring 15a, its inherent springiness enables it to engage the inner wall of the sleeve and to fix it therein against dislodgement therefrom.

Figure 2:
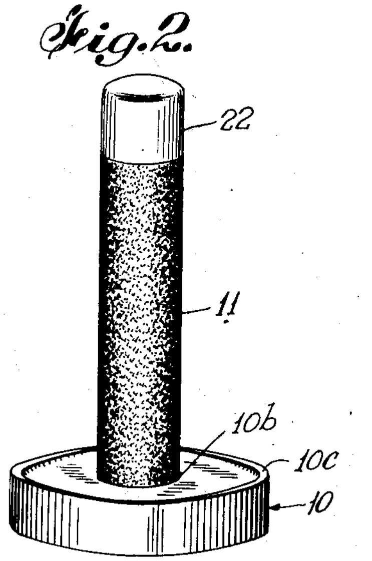
Fig. 2 is a similar view showing the sleeve in figure-concealing position.

Sleeve 15 is made, preferably, of plastics and it may or may not be transparent. It is sufficient that an opaque coating 15b be applied to its outer surface, said opaque coating 15b corresponding to the opaque coating 23 on the inside of cylindrical container 11. The opaque coating 23 on the inside of the container is exposed to view through the transparent wall of said container. The outside opaque coating 15b of the sleeve is also exposed to view through the transparent wall of said container when said sleeve rises above the top limits of the inside opaque coating 23 of said container. It is extremely difficult to detect the line of demarcation between the top edge of said inside coating 23 and the outside coating 15b of the sleeve. See Fig. 2.

The normal tendency of the buoyant sleeve is to rise in fluid 12. Its upward movement will stop when its cork ring engages the ring which is interposed between the pedestal and the human figure it supports. Downward movement of said buoyant sleeve may be effected by means of the magnetic ring 17 above mentioned. As has above been indicated, this ring may be made of non-magnetic material and a pair of magnets 18 and 19 may be installed therein to provide the necessary magnetic attraction with respect to the split ring 16. These magnets are disposed on a common diametric line in said ring, the north pole of magnet 18 and the south pole of magnet 19 pointing toward each other and toward and adjacent the cylindrical container 11. The magnetic influences of said magnets are thereby brought to bear upon the split ring in the sleeve so that when ring 17 is mounted upon the cylindrical container 11 and is brought downwardly thereon to its position of rest on base 10, said split ring is attracted by the two bar magnets and said split ring and the sleeve to which it is affixed are thereby brought downwardly to their respective positions of Fig. 3. Peripheral ridge 10c on the base will help to center ring 17 as Fig. 3 clearly shows.

Figure 6:
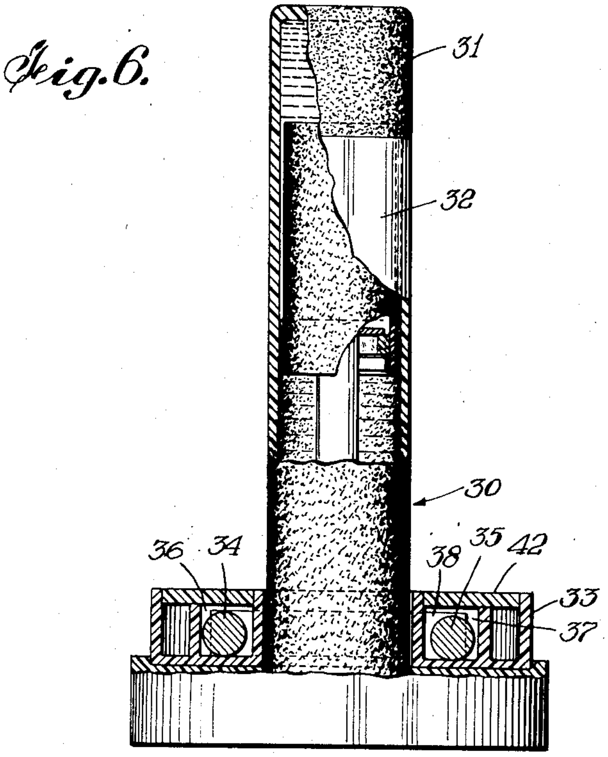
Fig. 6 is a front view of a magnetic toy made in accordance with the second preferred form of this invention, wherein the magnetic ring is shown in vertical section, and the fluid container is partly broken away and in section, as is the movable sleeve, to expose the working parts in said fluid container.
Figure 7:
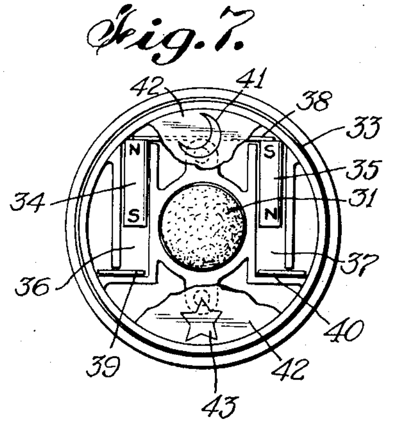
Fig. 7 is a top view of the magnetic ring which is used in the second preferred form of the invention, the top wall of said ring being broken away in part to expose the two bar magnets mounted therein and the retaining members or anchors for said magnets, showing said magnets anchored in such position as to enable them to exert magnetic influence upon the metallic ring in the movable sleeve.
Figure 8:
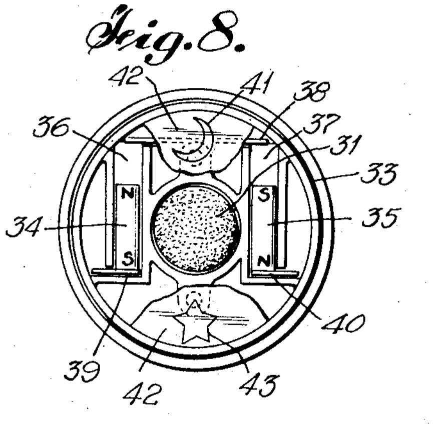
Fig. 8 is a similar view showing the magnets anchored in another position wherein their magnetic influence upon the metallic ring in the movable sleeve is negligible.

The magnetic toy 30 which is shown in Figs. 6, 7 and 8 and which illustrates the second preferred form of this invention, is basically similar to the magnetic toy shown in the first five figures of the drawing. There is no essential difference between their respective bases and fluid containers and the mechanism within said containers. It may be noted, however, that there is no cap on magnetic toy 30 corresponding to cap 22 of the above described magnetic toy. Instead an opaque coating 31 is applied to the top end of cylindrical container 32 in magnetic toy 30. Its function, like that of top cap 22, is to conceal whatever air bubbles may happen to be trapped in the top end of the fluid container. It may also be noted that the wall of fluid container 32 is of uniform thickness throughout in contra-distinction to the wall structure of fluid container 11 as shown in Fig. 3.

The important differences between the two magnetic toys reside in their respective magnetic rings 17 and 33. In ring 17 there are two bar magnets which are arranged in radial relation thereto and which are fixed in their respective positions. In ring 33 on the other hand, there are two bar magnets 34 and 35 respectively which are arranged in parallel relationship along what may be described as a pair of chords extending tangentially of the cylindrical container. These bar magnets are movably mounted in a pair of channels 36 and 37 respectively which are formed in ring 33. Their range of movement may be determined by comparing their respective positions in Fig. 7 with their respective positions in Fig. 8. In Fig. 7 the north pole of magnet 34 and the south pole of magnet 35 are shown to be disposed adjacent the circumferential edge of ring 33; the south pole of magnet 34 and the north pole of magnet 35 are shown to coincide, substantially, with a diametric line extending through said ring and said cylindrical fluid container. In Fig. 8 on the other hand the magnets are shown to have been moved to a central position relative to said cylindrical fluid container so that a transverse line drawn through the centers of said magnets will coincide with a diametrically extending line drawn through the ring and the fluid container. In Fig. 7 the south pole of magnet 34 and the north pole of magnet 35 exert a strong magnetic influence upon the split ring mounted within the movable sleeve. In Fig. 8 a negligible magnetic force is exerted upon the split ring since the magnetically weakest portions of the two magnets are there disposed adjacent said split ring. When the magnets are in their Fig. 7 positions, movement of ring 33 relative to the fluid container will cause a corresponding movement of the sleeve mounted therein. When the magnets are in their Fig. 8 positions, a corresponding movement of ring 33 will produce no effect upon the position of said sleeve.

It will be seen in Figs. 7 and 8 that anchoring means are provided to anchor the magnets in their respective positions of said Figs. 7 and 8. A bar or plate 38, made of ferrous material is fixedly mounted in ring 33 at one end of channels 36 and 37. This bar is sufficiently long to extend from one channel to the other as Fig. 7 clearly shows. At the opposite end of channel 36 is a relatively small bar or plate 39, also made of ferrous material, and a similar bar or plate 40 is mounted at the correspondingly opposite end of channel 37. When ring 33 is jarred, as by tapping it with the hand or against a hard object, the magnets will be caused to slide in their respective channels, either toward bar 38 or plates 39 and 40. The direction of movement of the magnets will be determined by the point at which the ring is tapped or caused to tap an object. The representation 41 of a half moon or quarter moon is provided on top wall 42 of ring 33, adjacent bar 38. Diametrically opposite is the representation 43 of a star. These representations or symbols will enable the person using the toy to determine which end of the ring to tap. When the ring is tapped to send the magnets in the direction of bar 38, they will engage said bar and secure themselves magnetically thereto. They will then remain in the positions which they are shown to occupy in Fig. 7 until the ring is tapped to jar them loose from bar 38 and send them in the direction of plates 39 and 40. They will then engage said plates magnetically and retain the positions which they are shown to occupy in Fig. 8 until further tapping will dislodge them in the manner aforesaid.

There is, therefore, no difference in operation between the two magnetic toys insofar as actuating the movable sleeve is concerned. The only difference resides in the construction and use of the magnetic control ring. In the first preferred form of the invention, the ring is always adapted to exert magnetic influence upon the split ring in the movable sleeve. In the second preferred form of the invention, the magnetic control ring may at times be adapted to exert magnetic influence upon the split ring in the sleeve, and at other times it may not be adapted to exert such influence upon said split ring. The determining factor is, of course, the location of the two magnets.

Magnetic toy 50 is basically similar to magnetic toy 30 shown in Fig. 6 of the drawing. It differs in only two essential respects: in the construction of its floating sleeve 51 and in the anchoring means for the magnets in its magnetic ring 52.

The floating sleeve which the first two forms of the invention employ is made of material which is not buoyant in the fluid in which it is immersed. A buoyant member such as cork must accordingly be affixed to the sleeve to enable it to float in said fluid. In the third form of the invention, on the other hand, the floating sleeve is itself made of buoyant material, that is of material whose specific gravity, taking into account the weight of iron ring 53, is exceeded by the specific gravity of the liquid 54 in container 55. More specifically, a sleeve made of a polyethylene plastic, such as Polythene of E. I. du Pont de Nemours & Co., Inc., and ethylene glycol (also known as glycol and ethylene alcohol) as a liquid, may be used in this form of the invention. The plastic is inert in the liquid and there is virtually no absorption of said liquid by the plastic. Other suitable materials and liquids may also, of course, be utilized.

In principle, magnetic ring 52 resembles magnetic ring 33 which is shown in Figs. 7 and 8. Magnetic ring 52 comprises a hollow, ring-shaped housing 57, a bar magnet 58, a second bar magnet 59, a ferrous metal plate 60 which serves as an anchor for said magnets at one end thereof, and a second ferrous metal plate 61 which serves as an anchor for said magnets at their opposite end. Magnets 58 and 59 are slidably mounted on opposite sides of the center hole of the ring-shaped housing, in parallel channels or compartments 62 and 63 respectively. It will be noted that metal plate 60 is a straight bar which extends in perpendicular relation to the two channels 62 and 63 and its two ends project into said channels at one end thereof. Metal plate 61 is bowed in its center portion to clear the annular wall 57*a* of the housing which forms and encircles the central hole thereof. The two end portions of metal plate 61 are aligned with each other and they project into the opposite ends of channels 62 and 63 in perpendicular relation thereto. Thus the end portions of bowed metal plate 61 are parallel to metal plate 60 and the two magnets are normal both to said end portions of bowed metal plate 61 and to the end portions of metal plate 60.

When the magnets are caused to slide in the direction of metal plate 60, they secure or anchor themselves magnetically to said plate as Fig. 10 clearly shows. In effect, a horseshoe magnet is formed in which plate 60 constitutes the yoke and magnets 58 and 59 constitute the arms and legs. When the magnets are dislodged from metal plate 60 and caused to slide toward the aligned end portions of bowed metal plate 61, they attach themselves magnetically to said end portions of the bowed plate as shown in Fig. 11. Again a horseshoe magnet is in effect formed with the bowed metal plate as the yoke and the two magnets as the arms or legs.

When the two magnets are in the positions which they are shown to occupy in Fig. 10, their free ends are disposed adjacent ferrous metal ring 53 and they are thereby enabled to exert magnetic influence upon said ring. When the magnets are in the positions which they are shown to occupy in Fig. 11, their free poles lie beyond the center of the magnetic ring 52 and hence relatively remote from iron ring 53. The magnetic flux is now carried around said iron ring 53, through the bowed metal plate 61. The magnetic influence which the two magnets are thus enabled to exert upon ring 53 is negligible. It is this feature which carries the magnetic flux around ring 53 which distinguishes magnetic ring 52 from magnetic ring 33 above described.

It will be understood from the foregoing that the preferred forms of the invention which have above been described and which are shown in the drawing are presented solely for purposes of illustration and not for purposes of limitation. Modifications in construction may be incorporated therein and other forms of the invention may be provided, all within the broad scope and spirit of the invention. For example, the precise shape of the magnetic member (above identified as the magnetic ring) is not very important and hence, for purposes of convenience and to avoid unnecessary limitation, said magnetic member will be referred to in at least some of the claims as a "magnetic wand." Other terminology which the claims will employ, follows: The term "magnetic" will be used to designate or describe both a magnet and a magnetically responsive element, such as iron ring 53 last above mentioned. The floating sleeve which is movable to conceal and expose the human figure will be referred to in the claims as the "screen" or "floating screen" or "movable screen." The opaque portion or coating of the fluid container may be referred to as the "fixed screen."

Also illustrative of the many variations of which this invention is susceptible are the following: The shape, proportions and dimensions of the several component parts of the toy may be varied in accordance with individual preferences and requirements. The number, location and orientation of the magnets may also be varied as desired and as required. For example, a single magnet may be used in place of the two magnets shown in the drawing. It would, of course, have to be sufficiently strong so that in one position it will exert magnetic influence upon the floating screen and in another position it will exert no magnetic influence or negligible magnetic influence upon said floating screen.

We claim:

1. A magnetic toy of the character described, comprising a closed container, a transparent wall in said container, a transparent fluid confined within said container, a human figure or the like mounted within said container and normally visible through said transparent wall, a screen which is buoyant in said fluid being mounted in said container for upward movement to conceal said human figure and for downward movement to reveal said human figure, magnetic means associated with said screen for integral movement therewith, a wand which is movable outside the container, and a magnetic element which is movably mounted in said wand, said magnetic element being movable to one position in said wand where it is able to influence said magnetic means, and being movable to another position in said wand where it is unable to influence said magnetic means.

2. A magnetic toy in accordance with claim 1 wherein magnetically responsive elements are fixedly mounted within the wand adjacent the two positions of the magnetic element in said wand, said magnetically responsive elements functioning as anchors for said magnetic element in its said positions.

3. A magnetic toy in accordance with claim 1 wherein a magnetically responsive member is fixed adjacent at least one of the two positions of the magnetic element to magnetically anchor said magnetic element in said position.

4. A magnetic toy in accordance with claim 1 wherein the magnetic element in the wand comprises a magnet having two oppositely disposed, magnetically strong poles and a portion intermediate said poles which is magnetically weak, said magnet being movable to one position in said wand to bring one of its poles into close proximity to the magnetic means associated with the screen in order to influence said magnetic means and thereby to control the position of said screen, said magnet being movable to another position to bring its intermediate portion into close proximity to the magnetic means in order to weaken its influence upon said magnetic means and thereby to lose control of the position of said screen.

5. A magnetic toy in accordance with claim 1 wherein the magnetic element is movable in said wand from a magnetically strong position relative to the magnetic means to a magnetically weak position relative to said magnetic means, and from a magnetically weak position relative to said magnetic means to a magnetically strong position relative thereto.

JACK C. WILSON.
HARRY W. WILSON.

References Cited in the file of this patent

UNITED STATES PATENTS

| Number | Name | Date |
|---|---|---|
| 1,107,481 | Boggs | Aug. 18, 1914 |
| 2,246,464 | Gerber | June 17, 1941 |
| 2,260,516 | Gerber | Oct. 28, 1941 |
| 2,307,205 | Ewald et al. | Jan. 5, 1943 |
| 2,353,550 | De Forest et al. | July 11, 1944 |
| 2,458,759 | Abell | Jan. 11, 1949 |
| 2,458,970 | Wilson | Jan. 11, 1949 |
| 2,475,630 | Melas et al. | July 12, 1949 |
| 2,479,363 | Jewell | Aug. 16, 1949 |
| 2,525,232 | McGaughy | Oct. 10, 1950 |
| 2,546,344 | Levy | Mar. 27, 1951 |
| 2,580,305 | Kremer | Dec. 25, 1951 |